United States Patent [19]

Albertini

[11] 3,911,446

[45] Oct. 7, 1975

[54] AUTOMATIC TIMEKEEPING AND ACCOUNTING UNIT

[75] Inventor: Eugene J. Albertini, Hidden Hills, Calif.

[73] Assignee: Chronometrics, Inc., Los Angeles, Calif.

[22] Filed: Mar. 26, 1974

[21] Appl. No.: 454,811

[52] U.S. Cl. .............. 346/33 R; 179/2 TC; 179/6 E; 179/7.1 R

[51] Int. Cl.² .............. G07C 1/10

[58] Field of Search ...... 346/33 R; 179/7.1 R, 2 TC, 179/158, 6 E; 58/145 K, 152 T; 360/4

[56] References Cited

UNITED STATES PATENTS

| | | | |
|---|---|---|---|
| 3,555,193 | 1/1971 | Brand et al. | 179/7.1 R |
| 3,725,947 | 4/1973 | Albertini et al. | 346/33 R |
| 3,808,372 | 4/1974 | Sielsca | 179/6 E |

*Primary Examiner*—Joseph W. Hartary
*Assistant Examiner*—Stanley J. Witkowski
*Attorney, Agent, or Firm*—Jessup & Beecher

[57] ABSTRACT

An automatic timekeeping and accounting unit is provided which has particular utility for use by professional persons such as lawyers, accountants, and the like. The unit keeps track of the person's working activity during the day, and it includes a manually operated pushbutton switch which enables records to be kept of the time and subject matter of interrupting telephone calls, so that such information may be recorded along with information relating to other work activities.

3 Claims, 3 Drawing Figures

AUTOMATIC TIMEKEEPING AND ACCOUNTING UNIT

BACKGROUND OF THE INVENTION

U.S. Pat. No. 3,725,947 which issued April 3, 1973, and which is assigned to the present assignee, describes and claims an automatic timekeeping and accounting unit which functions automatically to record a client identifying number, work activity, code number, and the time spent at the particular work, as well as other appropriate data. The unit described in the patent also includes a mechanism which responds automatically to interrupting telephone calls, to permit data respecting such calls also to be recorded. However, such a mechanism requires that the unit be directly connected or coupled to the telephone lines which can often lead to problems and difficulties.

The unit of the present invention is similar in most respects to the unit described in the prior patent, but it does not require any special connection or coupling to the telephone lines, in order to maintain a record of the time and subject matter of interrupting telephone calls. Instead, the unit to be described includes a manually operated pushbutton switch, which is operated by the person using the unit. Whenever it is desired to keep a record of the subject matter and time spent on an interrupting telephone call.

The principal purpose of the unit of the present invention, and of the unit described in the prior patent, is to relieve the practicing professional lawyer, accountant, architect, or the like of the task of maintaining time records for billing purposes of the various clients which he services, and of subsequently assimilating and processing the time records and transferring the information from the time records to separate billing statements to be sent to the clients.

In the use of the unit of the invention, and of the patent, the user, upon the start of any work activity, merely presses appropriate pushbutton switches so that data identifying the client and the work activity performed on his particular behalf may be recorded. The user then pushes a "start" pushbutton which starts the time recorder and, upon the completion of the work, he pushes an "end" pushbutton which stops the time recorder and causes the time spent on the particular activity to be recorded.

The unit described in the patent is constructed so that a telephone call will automatically stop the recording time on the work activity interrupted by the call, and causes the interrupted work to be charged out, and the telephone call activity code and time to be recorded. Then, all the user need do if a charge is to be made, is to enter a code number identifying the client to whom the telehpone conference is to be charged. The identifying data of the interrupted work activity is stored in a memory in the unit during the telephone call and, upon completion of the call, the interrupted work activity automatically continues to be recorded. The operation of the unit to be described herein is similar to that of the prior patent, except that the operation of the present unit for recording the telephone call is initiated by a pushbutton switch which is actuated by the user, so that the need to couple or connect the present unit directly to the telephone line is obviated.

DETAILED DESCRIPTION OF THE ILLUSTRATED EMBODIMENT

Figure 1:
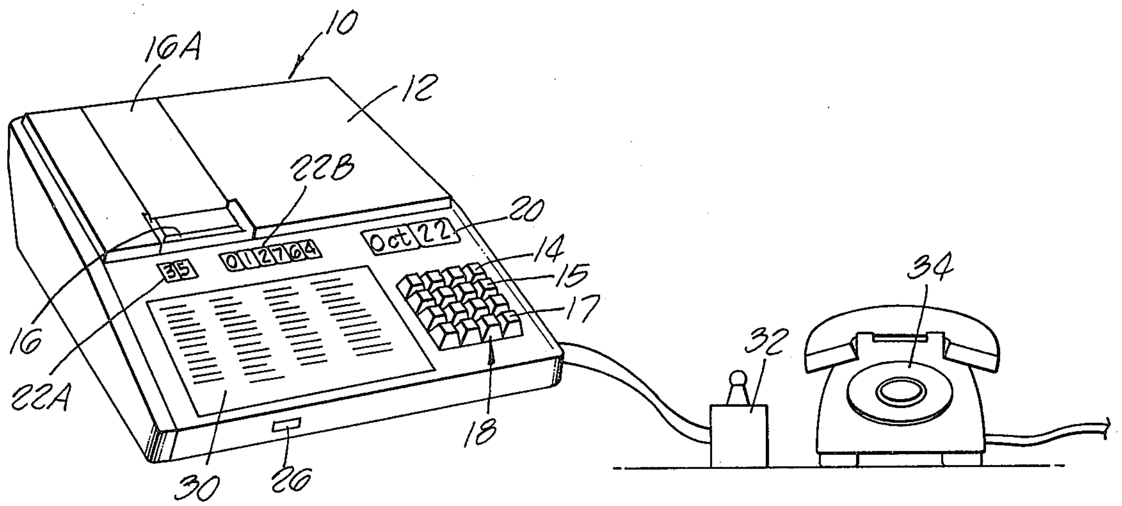
FIG. 1 is a perspective view of an automatic timekeeping and accounting unit which is constructed in accordance with one embodiment of the invention.
Figure 2:
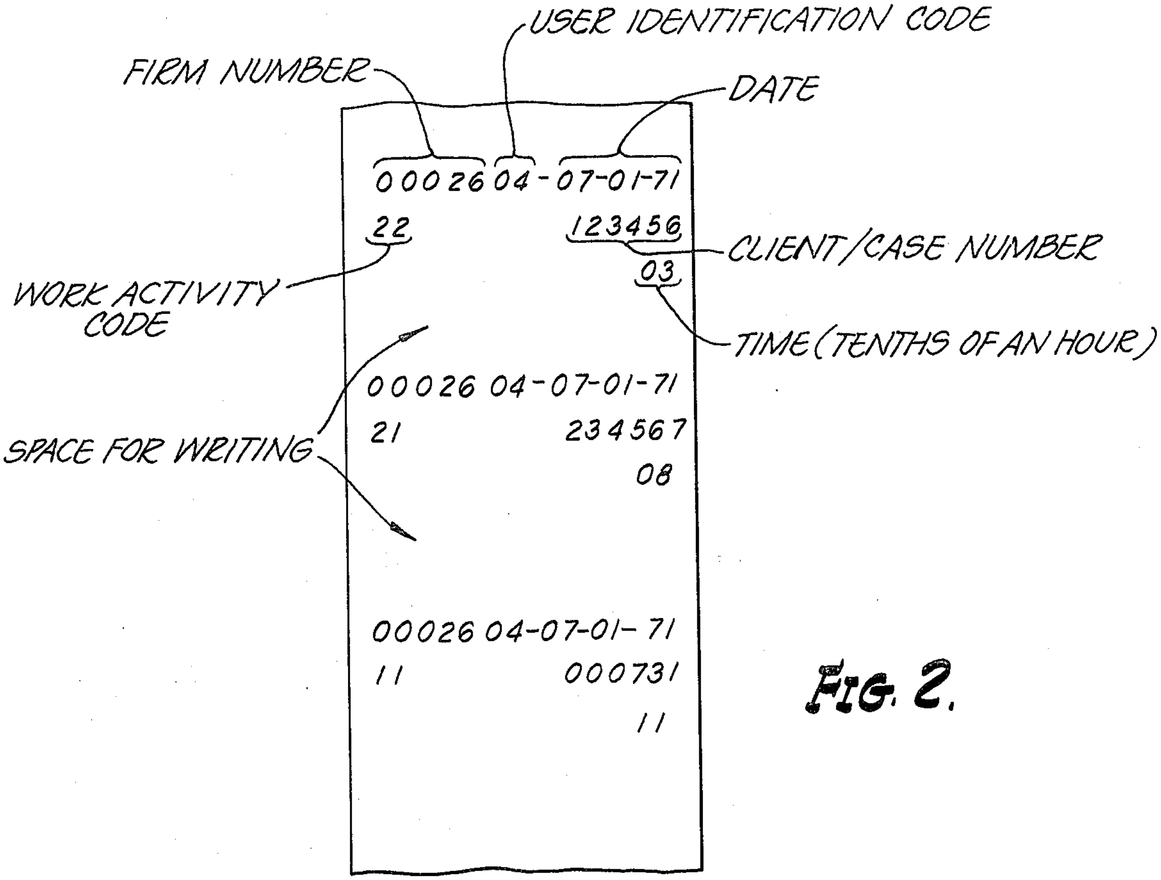
FIG. 2 is a fragment of a paper tape which is used in the unit of FIG. 1, and which shows the manner in which data may be recorded on the tape.

The timekeeping unit shown in FIG. 1 is designated generally as 10, and it is equipped with a cover 12 which may be opened to reveal the internal machanism of the unit. The unit 10 of FIG. 1 includes a paper tape printing mechanism 16 which incorporates a paper tape 16A. The paper tape 16A is mounted on an appropriate tape transport directly over the top of the cover 12, as shown in FIG. 1. As the timekeeping unit is being operated, the paper tape printing mechanism 16 operates to draw the paper tape 16A across the top of the cover 12, and to print appropriate data in columnar form on the tape, as shown in FIG. 2. The paper tape is exposed so that additional information may be written directly on the tape by the user, if he so desires.

The unit 10 also includes a numeric keyboard 18 which is operated so that code numbers identifying the various clients may be fed into the system. The number fed into the system at any particular time is revealed on the paper tape 16 observable at the top of the unit, as shown in FIG. 1, and is also observable by means of a display 22B. The unit also includes a display 22A which displays any one of a plurality of designated work activity numbers, punched into the unit by the operation of the keyboard 18, and which identifies the particular work activity being performed for any particular client.

An appropriate chart 30 may be fitted directly onto the machine to list a variety of different work activities, and a corresponding code number for each. In addition, the keyboard 18 includes a "start" key 14, an "end" key 15, an "advance paper" key 17. An on-off switch 26 for the unit is also provided. Also a set of thumbwheel switches 20 are positioned on the face of the unit for setting the particular date during which the unit is operated.

As shown in FIG. 2, the information printed on the paper tape 16A is columnar in nature and it includes, for example, a six digit client/case number, of which the first four digits identify the client, and the fifth digit identifies the client's case number, and the sixth digit is a check digit. This client/case number is also displayed by the display 22B. Also recorded is the work activity code number of two digits, which is displayed by the display 22A, and an elapsed time number of two digits. The elapsed time is recorded in tenths of an hour.

The foregoing data represents an operational transaction, and each operational transaction is preceded with a five digit number representing the firm using the equipment, a two digit number representing the individual user, both of which are wired into the system, and a six digit number representing the date, as set on the thumbwheel switches 20.

The pushbutton entry keyboard is constructed for the pushbutton entry of digits 0–9, and it also contains the start pushbutton switch 14, and the end pushbutton switch 15. The keyboard also controls the entry of a number of distinct work activities in the form of the two digit code, as determined from the chart 30, and which is displayed by the display 22A. The on-off switch 26 controls the power to the unit. The start switch 14, when activated starts the timing mechanism in the unit, and causes the transaction identifying data to be printed on the paper tape 16A. The end switch 15, when actuated, causes the elapsed time to be printed, stops the timer mechanism, and advances the columnar paper printer mechanism 16. The advance pushbutton 17, when activated, provides a control whereby the paper 16A may be advanced at any time.

To activate the unit 10 of FIG. 1 for normal operation, the user first operates the on-off switch 26 to turn on the unit, and he then operates the switchboard 18 to set up the particular two digit work activity code on the display 22A, corresponding to the work on which he is engaged. He then pushes the start pushbutton 14, and he then enters the proper six digit client/case account number through the keyboard 18. The machine then records all the necessary data, as shown in FIG. 2, with the exception of the time record. At the end of the particular activity, the user then presses the end pushbutton 15, and the time spent on the particular work activity for the particular client is then recorded. The unit is then ready for the next work activity to be identified and timed.

For a telephone interruption, and only when the user operates a pushbutton switch 32, which is positioned adjacent to the telephone 34, and which is connected to the unit 10, will the unit be caused to stop and the interrupted work activity to be charged out, and its identifying data to be stored in memory in the machine. Then, the unit operates to identify the telephone interruption by a particular identification code, and to record the time spent on the telephone conference.

If the user wishes to record the telephone conference for billing purposes, he also sets up the client's identifying number through the keyboard 18, and he presses the end pushbutton 15 at the end of the telephone conference, so that a record may be made of the time spent with the particular client on the telephone. Then, the unit automatically prints the interrupted work activity data back onto the paper tape 16A, and begins keeping time again. The use of the pushbutton 32, as pointed out above, permits the unit to be controlled for incoming telephone calls, without requiring any direct connection or coupling to the telephone line.

Any error may be corrected directly on the paper tape 16a by the use of pen or pencil and, as shown in FIG. 2, a space may be provided between each separate work activity, to permit the user to enter further notes and information on the paper tape, if he so desires.

Figure 3:
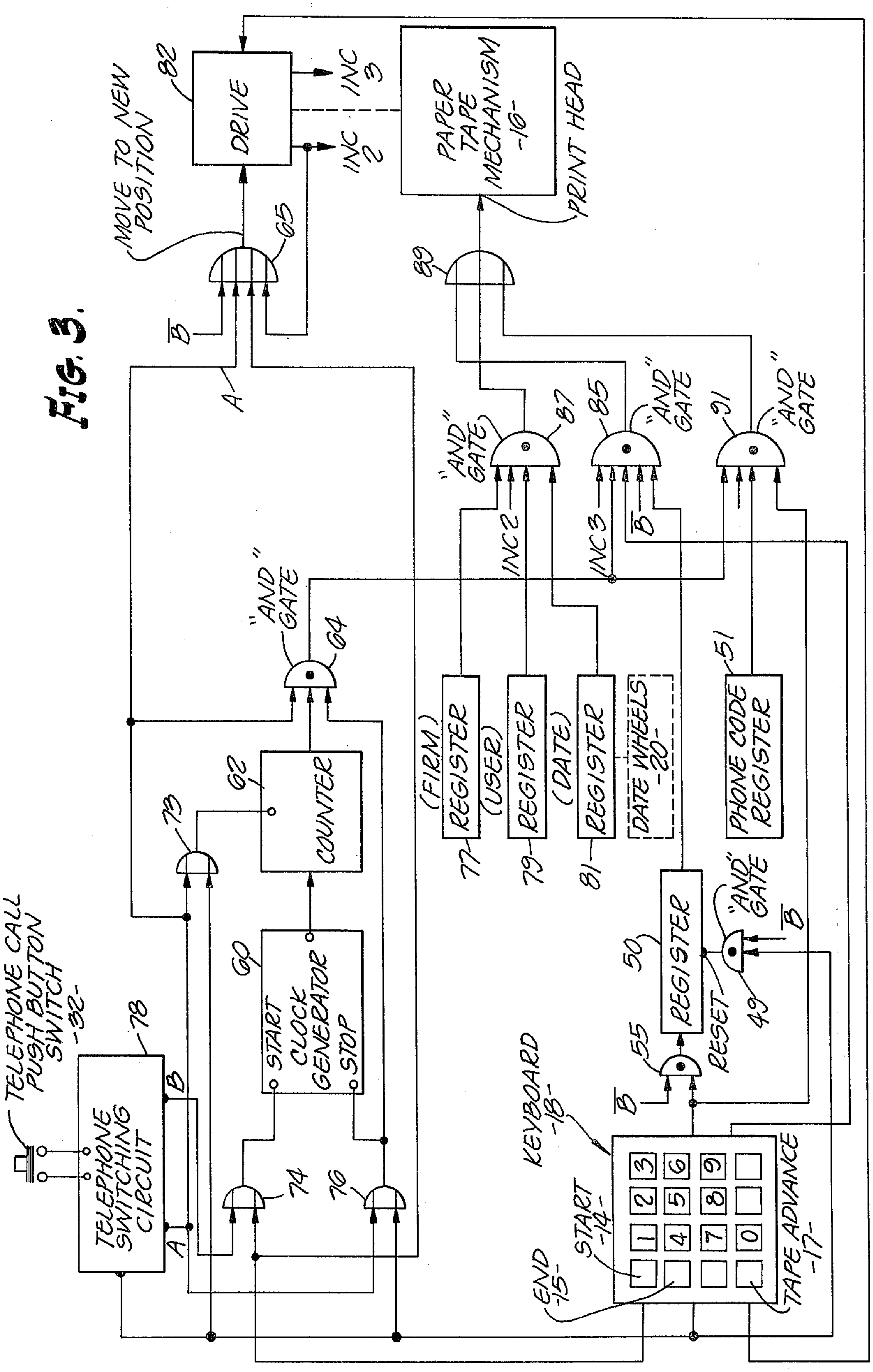
FIG. 3 is a logic block diagram illustrating appropriate electronic circuitry and components which may be incorporated into the unit of FIG. 1.

As shown in the block logic diagram of FIG. 3, the keyboard 18 associated with the unit 10 of FIG. 1 feeds its information through an and gate 55 into a register 50, so that any number set up on the keyboard to identify a particular client appears in the register 50. The coding used in the register 50 may be a binary code, or other appropriate code techniques may be used. The output of the register is fed to an and gate 85, and through a subsequent "or" gate 89 to the print head of the paper tape mechanism 16.

The various logic components shown in FIG. 3, including the register, and gates, or gates, and the like are well known to the art, and need not be described in detail. Moreover, any appropriate paper tape mechanism 16 and associated drive may be used, so that these components likewise need not be shown or described in detail, insofar as a clear understanding of the concept of the present invention is concerned.

The electronic system of FIG. 3 also includes an appropriate clock generator 60 which generates clock pulses, when activated. The start pushbutton 14 is connected through an or gate 74 to the start input of the clock generator 60, so that whenever the start pushbutton 14 is actuated, the clock generator 60 begins to generate clock pulses. The end pushbutton switch 15 is connected through an or gate 76 to the "stop" input of the clock generator 60, so that whenever the end pushbutton 15 is actuated, the clock generator 60 is deactivated.

When activated, the clock generator 60 generates a series of regularly spaced clock pulses, and these clock pulses are applied to a pulse counter 62. The pulse counter 62 proceeds from one count to the next as long as the clock generator 60 is activated to generate the clock pulses. The clock pulses from the clock generator 60 are applied to an and gate 64 which, in turn, is connected to and gates 85 and 91. The end pushbutton switch 15 is also connected to the and gate 64 through the or gate 76. The start pushbutton switch 14 is connected through an or gate 65 to a drive 82 for the paper tape mechanism 16. Whenever the start pushbutton switch 14 is actuated, the drive 82 is caused to move the paper tape mechanism 16 from one position to the next, so that the paper tape mechanism is ready for a new set of data. The advance pushbutton switch 17 is also connected to the drive mechanism so that whenever the pushbutton switch 17 is actuated, the drive 82 causes the paper tape mechanism to move to the next position.

The keyboard 18 may also be operated to supply the two digit work activity code to the paper tape mechanism 16, and when so operated, the two digit information is applied to the and gate 85. A register 77 is provided, in which the firm identifying number is wired in by any appropriate means. A register 79 is also provided in which the user identifying number is wired in by any appropriate means. A register 81 is also provided, in which the date identifying number is set by adjustment of the thumbwheel switch 20. All these registers are connected to an and gate 87. When the drive mechanism 82 is driven to a new position by actuating the start pushbutton switch 14, it generates a signal INC2 which enables the and gate 87 so that the information in the three registers 77, 79, and 81 may be printed on the paper tape. The INC2 signal is also supplied to the drive 82 through the or gate 65, so that the paper tape may be automatically moved by the mechanism 16 to its next position.

The drive 82 then generates a signal INC3 which enables the and gate 85, and which permits during normal operation of the system the keyboard register 50 information, and the work activity information from the keyboard 18, to be printed on the paper tape. When the end pushbutton switch 15 is actuated, the and gate 64 is enabled so that the time information may also be printed through the and gate 85 and through the or gate 89.

A telephone switching circuit 78 is provided which has an output terminal A connected to the or gate 76, and which also has an output terminal B connected to the or gate 74. The telephone switching circuit 78 is energized whenever the user actuates the telephone call pushbutton switch 32. When that occurs, a signal is first generated at the output terminal A (output A). The output A first enables the and gate 64 so that the previously accumulated time on the counter 62 may be passed through the and gate 85 to be printed on the paper tape 16A by the paper tape mechanism 16.

The output A is also applied through the or gate 65 to the drive 82, so that the paper tape 16a may be moved to the next position. The output A next passes through the or gate 76 to stop the clock generator 60, and it passes through the or gate 73 to reset the counter 62.

The output A is then replaced by the signal at the output terminal B of the telephone switching circuit 78 (output B). The output B passes through the or gate 74 to start the clock generator 60, which, in turn, causes the counter 62 to be activated to make a count of the time elapsed during the telephone conference. During the normal operation of the system, no signal appears at the output terminal B of the telephone switching circuit 78, so that a $\overline{B}$ situation is created. During the $\overline{B}$ condition, the and gate 85 is enabled for normal operation of the system, and the and gate 91 is disabled.

Therefore, during the $\overline{B}$ condition, and during normal operation of the system, information from the keyboard 18 may be read through the and gate 55 into the register 50, and from there through the enabled and gate 85 and through the or gate 89 to the paper tape mechanism 16. Also, the work activity information set by the keyboard is passed through the enabled and gate 85 during normal $\overline{B}$ operation to be printed and recorded. At the end of a particular activity, and while the system is in its normal mode, the end pushbutton switch 15 is depressed to cause the time information to be recorded, as mentioned above, and this causes the register 50 to be reset by the signal passed through the enabled and gate 49. The counter 62 is also reset through the or gate 73.

During a telephone conference, however, and for continuance of the output B from the switching circuit 78, the normal operation and gate 85 is disabled, and the telephone conference and gate 91 is enabled. During this B mode, the telephone code number from the register 51 is passed through the and gate 91 and through the or gate 89 to be printed by the paper tape mechanism to indicate that the data refers to a telephone conference.

Also, the keyboard 18 may be operated to identify the calling or called party on the telephone and this information will be applied directly through the enabled and gate 91 and through the or gate 89 to the print head of the paper tape mechanism 16. Since, the and gate 55 is now disabled, the new number set on the keyboard 18, pertaining to the telephone conference, will not disturb the previous number entered into the register 50, pertaining to the interrupted work.

At the termination of the telephone conference, and when the end pushbutton switch 15 is actuated to record the elapsed time of the telephone conference, the and gate 64 is again enabled, so that the count in the counter 62 may be passed through the and gate 91 to the paper tape mechanism. The operation of the end pushbutton switch 15 also serves to reset the telephone switching circuit 78, so that the output changes from B to $\overline{B}$, and the $\overline{B}$ output is introduced to the drive 82 through the or gate 65 to cause the drive to move the paper tape 16A to its next position. The interrupted data from the register 50 is again recorded as the and gate 85 is again enabled.

The registers 77 and 79 may take the form of internally wired program printed circuit boards which are designed to establish code numbers identifying the firm and the particular partner or associate of the firm who is using the equipment, as explained above. The date register 81 is set from day to day by setting the thumbwheel switches 20, so that the date of the different transactions may be identified.

The invention provides, therefore, an improved timekeeping and accounting machine and system for keeping track of billable time in a professional office, and which also serves conveniently to record billable data concerning telephone conferences which interrupt normal work activities, these latter features being achieved without any direct connection or coupling to the telephone lines.

It will be appreciated that while a particular embodiment of the invention has been shown and described, modifications may be made. It is intended in the following claims to cover the modifications which come within the spirit and scope of the invention.

What is claimed is:

1. An automatic timekeeping and accounting unit including manually operated means for establishing indicia representing an account and for establishing indicia representing a work activity; a clock means for establishing the time interval in which a particular work activity occurred; recording means coupled to said manually operated means and to said clock means for recording the aforesaid indicia; a telephone switching curcuit connected to said clock means; and manually operated switching means connected to said telephone switching circuit to activate said switching circuit and cause said switching circuit to stop the clock means when the switching means is actuated to indicate that the telephone is being operated.

2. The automatic timekeeping and accounting unit defined in claim 1, and which includes circuit means for maintaining information concerning an interrupted activity in memory in said unit upon the activation of said telephone switching circuit.

3. The automatic timekeeping and accounting unit defined in claim 1, and which includes further control circuitry responsive to the activation of said telephone switching circuit for enabling the time interval of a telephone conversation to be recorded by said recording means.

* * * * *